(12) United States Patent
Loos et al.

(10) Patent No.: US 11,668,818 B2
(45) Date of Patent: Jun. 6, 2023

(54) ULTRASONIC POSITION SENSOR

(71) Applicant: Woodward, Inc., Fort Collins, CO (US)

(72) Inventors: Jordan Loren Loos, Rockford, IL (US); Gregory Warren Pulley, Loveland, CO (US)

(73) Assignee: Woodward, Inc., Fort Collins, CO (US)

( * ) Notice: Subject to any disclaimer, the term of this patent is extended or adjusted under 35 U.S.C. 154(b) by 154 days.

(21) Appl. No.: 16/987,828

(22) Filed: Aug. 7, 2020

(65) Prior Publication Data

US 2022/0043142 A1 Feb. 10, 2022

(51) Int. Cl.
*G01S 15/06* (2006.01)
*G01S 7/52* (2006.01)

(52) U.S. Cl.
CPC .......... *G01S 15/06* (2013.01); *G01S 7/52036* (2013.01)

(58) Field of Classification Search
CPC ........... G01S 15/06; G01S 7/539; G01S 15/88
See application file for complete search history.

(56) References Cited

U.S. PATENT DOCUMENTS

| | | | |
|---|---|---|---|
| 3,218,852 A | 11/1965 | Scarpa et al. | |
| 3,575,050 A | 4/1971 | Lynnworth | |
| 3,925,692 A | 12/1975 | Leschek et al. | |
| 4,297,608 A | 10/1981 | Jensen | |
| 4,308,745 A | 1/1982 | Lisitsa et al. | |
| 4,320,659 A | 3/1982 | Lynnworth et al. | |
| 4,345,657 A | 8/1982 | Mig | |
| 5,464,039 A | 11/1995 | Bergamini | |
| 5,750,892 A | 5/1998 | Huang | |

(Continued)

FOREIGN PATENT DOCUMENTS

| | | |
|---|---|---|
| CN | 205642485 | 10/2016 |
| DE | 3116333 | 11/1982 |

(Continued)

OTHER PUBLICATIONS

PCT International Search Report and Written Opinion in International Appln. No. PCT/US2021/045040, dated Nov. 16, 2021, 15 pages.

(Continued)

*Primary Examiner* — Daniel L Murphy
*Assistant Examiner* — Amie M Ndure
(74) *Attorney, Agent, or Firm* — Fish & Richardson P.C.

(57) ABSTRACT

The subject matter of this specification can be embodied in, among other things, a position sensor system that includes a fluid effector that includes a housing having an inner surface defining a cavity, and a moveable body having a first face and a second face opposite the first face and configured to contact the inner surface and subdivide the cavity to define a first chamber and a second chamber, an acoustic transmitter system configured to emit a first emitted waveform toward the first face, and emit a second emitted waveform toward the second face, and an acoustic receiver system configured to detect a first reflected waveform based on a first reflection of the first emitted waveform based on the moveable body, and detect a second reflected waveform based on a second reflection of the second emitted waveform based on the moveable body.

34 Claims, 8 Drawing Sheets

(56) References Cited

U.S. PATENT DOCUMENTS

| | | | |
|---|---|---|---|
| 6,005,395 | A | 12/1999 | Chan et al. |
| 6,651,484 | B2 | 11/2003 | Fiebelkorn et al. |
| 7,051,765 | B1 | 5/2006 | Kelley et al. |
| 7,464,611 | B2 | 12/2008 | Matter |
| 7,600,417 | B2 | 10/2009 | Paradise |
| 7,954,387 | B1 | 6/2011 | Furlong et al. |
| 8,756,990 | B2 | 6/2014 | Speldrich |
| 9,057,391 | B2 | 6/2015 | Sawchuk et al. |
| 9,182,259 | B2 | 11/2015 | Suzuki |
| 9,187,974 | B2 | 11/2015 | Coonrod et al. |
| 9,239,337 | B2 | 1/2016 | Mueller |
| 9,261,389 | B2 | 2/2016 | Gill |
| 9,267,833 | B2 | 2/2016 | Ohmiya |
| 9,297,680 | B2 | 3/2016 | Maruyama et al. |
| 9,605,695 | B2 | 3/2017 | Sawchuk et al. |
| 9,891,085 | B2 | 2/2018 | Muhammad et al. |
| 10,126,762 | B2 | 11/2018 | Loos et al. |
| 10,309,432 | B2 | 6/2019 | Reckner et al. |
| 11,307,069 | B2 | 4/2022 | Loos |
| 2002/0195246 | A1* | 12/2002 | Davidson ............ B01J 8/02 166/177.6 |
| 2004/0093957 | A1 | 5/2004 | Buess |
| 2005/0016281 | A1 | 1/2005 | Hill et al. |
| 2005/0189108 | A1* | 9/2005 | Davidson ............ E21B 43/003 166/177.6 |
| 2007/0125826 | A1* | 6/2007 | Shelton, IV ..... A61B 17/07207 227/176.1 |
| 2007/0227263 | A1 | 10/2007 | Fukano |
| 2007/0233412 | A1 | 10/2007 | Gotoh |
| 2008/0294144 | A1* | 11/2008 | Leo ............ A61B 5/6885 604/535 |
| 2011/0042938 | A1 | 2/2011 | Gallagher et al. |
| 2012/0188842 | A1 | 6/2012 | Smith |
| 2012/0247223 | A1 | 10/2012 | Sawchuk et al. |
| 2013/0205892 | A1 | 8/2013 | Ueda |
| 2014/0198822 | A1 | 7/2014 | Lei et al. |
| 2014/0260513 | A1 | 9/2014 | Smirnov et al. |
| 2014/0260667 | A1 | 9/2014 | Berkcan |
| 2015/0013472 | A1 | 1/2015 | Gill et al. |
| 2015/0082913 | A1 | 3/2015 | Maruyama et al. |
| 2016/0258798 | A1 | 9/2016 | Muhammad et al. |
| 2017/0102364 | A1 | 4/2017 | Hill et al. |
| 2017/0350741 | A1* | 12/2017 | Marshall ............ G01F 1/74 |
| 2018/0058202 | A1* | 3/2018 | Disko ............ E21B 47/12 |
| 2018/0058209 | A1* | 3/2018 | Song ............ G01F 1/74 |
| 2018/0306625 | A1 | 10/2018 | Baker |
| 2019/0154026 | A1* | 5/2019 | Kamen ............ A61M 5/16831 |
| 2020/0041375 | A1 | 2/2020 | Bowdle |
| 2021/0164816 | A1 | 6/2021 | Loos |
| 2021/0278262 | A1 | 9/2021 | Loos |
| 2022/0034695 | A1 | 2/2022 | Loos |
| 2022/0042835 | A1 | 2/2022 | Loos |
| 2022/0042836 | A1 | 2/2022 | Loos |
| 2022/0214452 | A1 | 7/2022 | Pulley et al. |
| 2022/0299349 | A1 | 9/2022 | Loos et al. |

FOREIGN PATENT DOCUMENTS

| | | |
|---|---|---|
| DE | 19710296 | 3/1998 |
| DE | 29916826 | 11/2000 |
| DE | 102014205042 | 9/2015 |
| DE | 102016105338 | 9/2017 |
| DE | 202017007116 | 8/2019 |
| EP | 0451355 | 10/1991 |
| EP | 0907069 | 4/1999 |
| EP | 1188935 | 3/2002 |
| EP | 1279368 | 1/2003 |
| EP | 2232342 | 9/2010 |
| EP | 2824429 | 1/2015 |
| EP | 2827111 | 1/2015 |
| EP | 3222980 | 9/2017 |
| GB | 2259571 | 3/1993 |
| GB | 2321705 | 8/1998 |
| GB | 2336681 | 10/1999 |
| JP | 2006337059 | 12/2006 |
| JP | 2010261872 | 11/2010 |
| WO | WO9205042 | 4/1992 |
| WO | WO2009071746 | 6/2009 |
| WO | WO2016033534 | 3/2016 |
| WO | WO2021040540 | 3/2021 |
| WO | WO2021113444 | 6/2021 |

OTHER PUBLICATIONS

PCT International Search Report and Written Opinion in International Appln. No. PCT/US2021/045049, dated Nov. 16, 2021, 6 pages.

PCT Invitation to Pay Additional Fees, and, Where Applicable, Protest Fee in International Appln. No. PCT/US2021/045047, dated Nov. 19, 2021, 14 pages.

Puttmer et al., "Ultrasonic Density Sensor for Liquids", IEEE Transactions on Ultrasonics, Ferroelectrics, and Frequency Control, Jan. 2000, 47(1):85-92.

PCT International Search Report and Written Opinion in International Appln. No. PCT/US2021/045042, dated Nov. 19, 2021, 6 pages.

PCT International Search Report and Written Opinion in International Appln. No. PCT/US2021/045047, dated Mar. 1, 2022, 21 pages.

Hoche et al., "Ultrasound-Based Density Determination via Buffer Rod Techniques", J. Sens. Syst., 2013, 2:103-125.

Kazys et al., "Ultrasonic Technique for Density Measurement of Liquids in Extreme Conditions", Sensors, 2015, 15:19393-19415.

Nakamura, "Ultrasonic Transducers: Materials and Design for Sensors, Actuators and Medical Applications", Woodhead Publishing, 2012.

PCT International Search Report and Written Opinion in International Appln. No. PCT/US2020/063013, dated May 11, 2021, 21 pages.

PCT International Search Report and Written Opinion in International Appln. No. PCT/US2021/021103, dated Jun. 16, 2021, 14 pages.

PCT Invitation to Pay Additional Fees, and, Where Applicable, Protest Fee in International Appln. No. PCT/US2020/063013, dated Mar. 19, 2021, 16 pages.

PCT International Preliminary Report on Patentability in International Appln. No. PCT/US2020/063013, dated Feb. 21, 2022, 28 pages.

PCT International Search Report and Written Opinion in International Appln. No. PCT/US2022/075579, dated Dec. 23, 2022, 15 pages.

Flowconditioner.com [online], "Flow Conditioners," Canada Pipeline Accessories, Jun. 2021, retrieved on Dec. 14, 2022, retrieved from URL <https://www.flowconditioner.com/flow-conditioner/>, 6 pages.

NASA.gov [online], "Balanced Flow Meters without Moving Parts," NASA Technical Reports Server, Jan. 2008, retrieved on Dec. 14, 2022, retrieved from URL <https://ntrs.nasa.gov/citations/20090020619>, 2 pages.

NASA.gov [online], "NASA Tech Briefs, Jan. 2008," NASA Technical Reports Server, Jan. 2008, retrieved on Dec. 14, 2022, retrieved from URL <https://ntrs.nasa.gov/archive/nasa/casi.ntrs.nasa.gov/20090020593.pdf>, 43 pages.

No Author Listed, "ASME PTC 19.5-2004—Flow Measurement—Performance Test Codes," The American Society of Mechanical Engineers, Jul. 2005, 184 pages.

PIProcessinstrumentation.com [online], "Improving flow measurement accuracy with flow conditioners," Jan. 12, 2017, retrieved on Dec. 14, 2022, retrieved from URL <https://www.piprocessinstrumentation.com/home/article/15563560/improving-flow-measurement-accuracy-with-flow-conditioners>, 11 pages.

Sanderson et al., "Guidelines for the Use of Ultrasonic Non-Invasive Metering Techniques," Flow Measurement and Instrumentation, 2002, 13(4): 125-142.

Stoof et al., "Contributing to Economic Upstream Gas Metering with a Dual-Path Ultrasonic Flow Metering Solution," SICK AG, Oct. 2018, 20 pages.

(56) References Cited

OTHER PUBLICATIONS

Wateronline.com [online], "QCT Series In-Line Ultrasonic Flow Meters for Low Viscosity Liquid Applications," Jun. 2021, retrieved on Dec. 14, 2022, retrieved from URL <https://www.wateronline.com/doc/qct-series-in-line-ultrasonic-flow-meters-for-low-viscosity-liquid-applications-0001>, 1 page.
European Search Report in European Application No. EP 23151677.4, dated Apr. 3, 2023, 7 pages.

* cited by examiner

ULTRASONIC POSITION SENSOR

TECHNICAL FIELD

This instant specification relates to ultrasonic position sensors.

BACKGROUND

Position measurement devices are used for the characterization and operation of fluid control systems. Traditionally, effector (e.g., valve body, piston head) position tracking is achieved through the use of linear variable differential transformers (LVDTs). LVDTs drive system sizing and introduce accuracy and sizing constraints. Specifically, actuation devices generally require the LVDT be installed through the piston rod, driving actuator sizing.

Ultrasonic position sensors are a proven industrial technology that can be leveraged for position detection. Existing time of flight ultrasonic position sensors emit acoustic pings and measure the amount of time until reflected echoes of the pings return. The amount of time between the transmission and return of the pings is generally dependent upon the distance between the transceiver and the object being measured, and the speed of sound in the medium through which the pings are being transmitted. That speed of sound is dependent upon the characteristics of the medium, such as its density, temperature, and/or acoustic impedance. Existing time of flight ultrasonic position sensors depend upon on predetermined knowledge or determination of the speed of sound through the medium through which the pings are being transmitted in order to function. In applications such as fuel valves and pressure regulators, the temperatures and types of fuels used can vary, which can cause the speed of sound to vary dynamically during operation. The speed of sound of a medium can be sensed, but the inclusion of these additional sensors adds to the complexity, size, cost, and weight of such systems.

SUMMARY

In general, this document describes ultrasonic positon sensors.

In an example embodiment, a position sensor system includes a fluid effector that includes a housing having an inner surface defining a cavity, and a moveable body having a first face and a second face opposite the first face and configured for reciprocal movement within the housing and configured to contact the inner surface and subdivide the cavity to define a first fluid chamber at the first face and define a second fluid chamber at the second face, an acoustic transmitter system configured to emit a first emitted acoustic waveform in a first direction toward the first face, and emit a second emitted acoustic waveform in a second direction opposite the first direction toward the second face, and an acoustic receiver system configured to detect a first reflected acoustic waveform based on a first reflection of the first emitted acoustic waveform based on the moveable body, and detect a second reflected acoustic waveform based on a second reflection of the second emitted acoustic waveform based on the moveable body.

Various implementations can include some, all, or none of the following features. The position sensor system can include a timer configured to determine a first time of flight of the first emitted acoustic waveform and the first reflected acoustic waveform, and determine a second time of flight of the second emitted acoustic waveform and the second reflected acoustic waveform. The position sensor system can include a processor system configured to determine a position of the moveable body within the cavity based on the first time of flight and the second time of flight. The acoustic transmitter system can be configured to emit one or both of the first emitted acoustic waveform and the second emitted acoustic waveform through a fluid in the cavity, and the acoustic receiver system can be configured to receive one or both of the first reflected acoustic waveform and the second reflected acoustic waveform from the fluid in the cavity. The acoustic transmitter system can be configured to emit one or both of the first emitted acoustic waveform and the second emitted acoustic waveform through the housing, and the acoustic receiver system can be configured to receive one or both of the first reflected acoustic waveform and the second reflected acoustic waveform from the housing. The housing can include an acoustic impedance based on a position of an acoustic interface defined by contact between the moveable body and the housing, and at least one of the first reflected acoustic waveform and the second reflected acoustic waveform can be at least partly reflected based on the acoustic impedance. The acoustic transmitter can be configured to transmit the first emitted acoustic waveform at a predetermined emitted frequency, and the acoustic receiver can be configured to determine a reflected frequency of the first reflected acoustic waveform. The position sensor system can include a processor system configured to determine a speed of the moveable body based on the predetermined emitted frequency and the reflected frequency. The fluid effector can be a linear piston effector, the cavity can be a tubular cavity having a first longitudinal end and a second longitudinal end opposite the first longitudinal end, the moveable body can be a piston head configured for longitudinal movement within the tubular cavity, the acoustic transmitter system can include a first acoustic transmitter arranged at the first longitudinal end and a second acoustic transmitter arranged at the second longitudinal end, and the acoustic receiver system can include a first acoustic receiver arranged at the first longitudinal end and a second acoustic receiver arranged at the second longitudinal end. The fluid effector can be a rotary fluid effector, the cavity can be a cylindrical cavity defining a central axis, the moveable body can be a piston head configured for semi-elliptical movement within the cylindrical cavity about the central axis and can define an acoustic interface in a first portion of the housing proximal an axial position of the piston head within the cylindrical cavity, the acoustic transmitter system can be configured to emit the first emitted acoustic waveform elliptically through a second portion of the housing about the central axis in a first direction toward the first portion, and can be configured to emit the second emitted acoustic waveform elliptically through a third portion of the housing about the central axis in a second direction opposite the first direction toward the first portion, and the acoustic receiver system can include a first acoustic receiver arranged proximal the acoustic transmitter and configured to receive the first reflected acoustic waveform, and a second acoustic receiver arranged proximal the acoustic transmitter and configured to receive the second reflected acoustic waveform. The position sensor system can include a phase detector configured to determine a difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform.

In an example implementation, a method of position sensing includes emitting a first emitted acoustic waveform in a first direction through an acoustic medium having a first acoustic impedance toward a first side of an acoustic interface, emitting a second emitted acoustic waveform in a second direction, opposite the first direction, through the acoustic medium toward a second side of the acoustic interface opposite the first side, reflecting, by the acoustic interface, a first reflected acoustic waveform in the second direction based on the first emitted acoustic waveform, reflecting, by the acoustic interface, a second reflected acoustic waveform in the first direction based on the second emitted acoustic waveform, and determining a first position of the acoustic interface based on the first reflected acoustic waveform and the second reflected acoustic waveform.

Various implementations can include some, all, or none of the following features. The method can include determining a first time of flight based on the first emitted acoustic waveform and the first reflected acoustic waveform, and determining a second time of flight based on the second emitted acoustic waveform and the second reflected acoustic waveform, where determining a first position of the acoustic interface can be based on the first time of flight and the second time of flight. Determining the first position of the acoustic interface based on the first time of flight ($t_1$) and the second time of flight ($t_2$) can be given by an equation: $(t_1-t_2)/(t_1+t_2)$. The method can include determining a second position of the acoustic interface, and determining a speed of the acoustic interface based on the first position and the second position. The method can also include determining a reflected acoustic frequency based on one or both of the first reflected acoustic waveform and the second reflected acoustic waveform, and determining a speed of the acoustic interface based on the determined reflected acoustic frequency and a predetermined emitted acoustic frequency of one or both of the first emitted acoustic waveform and the second emitted acoustic waveform. The acoustic medium can be a fluid having a first acoustic impedance, the acoustic interface can be defined by a moveable body within a fluid effector and having a second acoustic impedance that is different than the first acoustic impedance, the first emitted acoustic waveform can be emitted toward a first face of the moveable body through the fluid, the second emitted acoustic waveform can be emitted toward a second face of the moveable body, arranged opposite the first face, through the fluid, the first reflected acoustic waveform can be based on a first reflection of the first emitted acoustic waveform by the first face, and the second reflected acoustic waveform can be based on a second reflection of the second emitted acoustic waveform by the second face. The acoustic medium can be a housing of a fluid effector, the housing having a first acoustic impedance and defining a cavity, and can include contacting a portion of the housing with a moveable body configured for movement within the cavity, and modifying, based on the contacting, the first acoustic impedance of the contacted portion of the housing to define a portion of the housing having a second acoustic impedance that is different from the first acoustic impedance, wherein the contacted portion of the housing can define the acoustic interface. The method can include determining a phase difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform, wherein determining a first position of the acoustic interface can be further based on the determined phase difference.

In another example embodiment, a non-transitory computer storage medium is encoded with a computer program, the program comprising instructions that when executed by data processing apparatus cause the data processing apparatus to perform operations including emitting a first emitted acoustic waveform in a first direction through an acoustic medium having a first acoustic impedance toward a first side of an acoustic interface, emitting a second emitted acoustic waveform in a second direction, opposite the first direction, through the acoustic medium toward a second side of the acoustic interface opposite the first side, detecting a first reflected acoustic waveform, based on the first emitted acoustic waveform, reflected in the second direction by the acoustic interface, detecting a second reflected acoustic waveform, based on the second emitted acoustic waveform, reflected in the first direction by the acoustic interface, and determining a first position of the acoustic interface based on the detected first reflected acoustic waveform and the detected second reflected acoustic waveform.

The systems and techniques described here may provide one or more of the following advantages. First, a system can determine a position and/or speed of a target object though an acoustic transmission medium. Second, the system can operate without determining the acoustic properties of the transmission medium. Third, the system can have a more efficient and/or economical mechanical design compared to existing mechanical position measurement solutions such as variable differential transformers (VDTs). Fourth, the system can have a more efficient and/or economical electronic design compared to existing ultrasonic position measurement solutions. Fifth, the system can provide a more space efficient option for system sizing, Sixth, the system can improve weight, pump demand, thermal loads, and measurement accuracy.

The details of one or more implementations are set forth in the accompanying drawings and the description below. Other features and advantages will be apparent from the description and drawings, and from the claims.

DETAILED DESCRIPTION

This document describes systems and techniques for ultrasonic position sensing, more particularly, for sensing the position of moveable members in fluid environments, such as valve bodies and piston heads. In general, the ultrasonic position sensing systems and techniques described in this document measure the distance from a moveable object to each end of its length of travel to determine a ratiometric position value that can be determined without needing to know or otherwise determine the speed of sound in the medium in which the ultrasonic signals are being transmitted.

Figure 1:
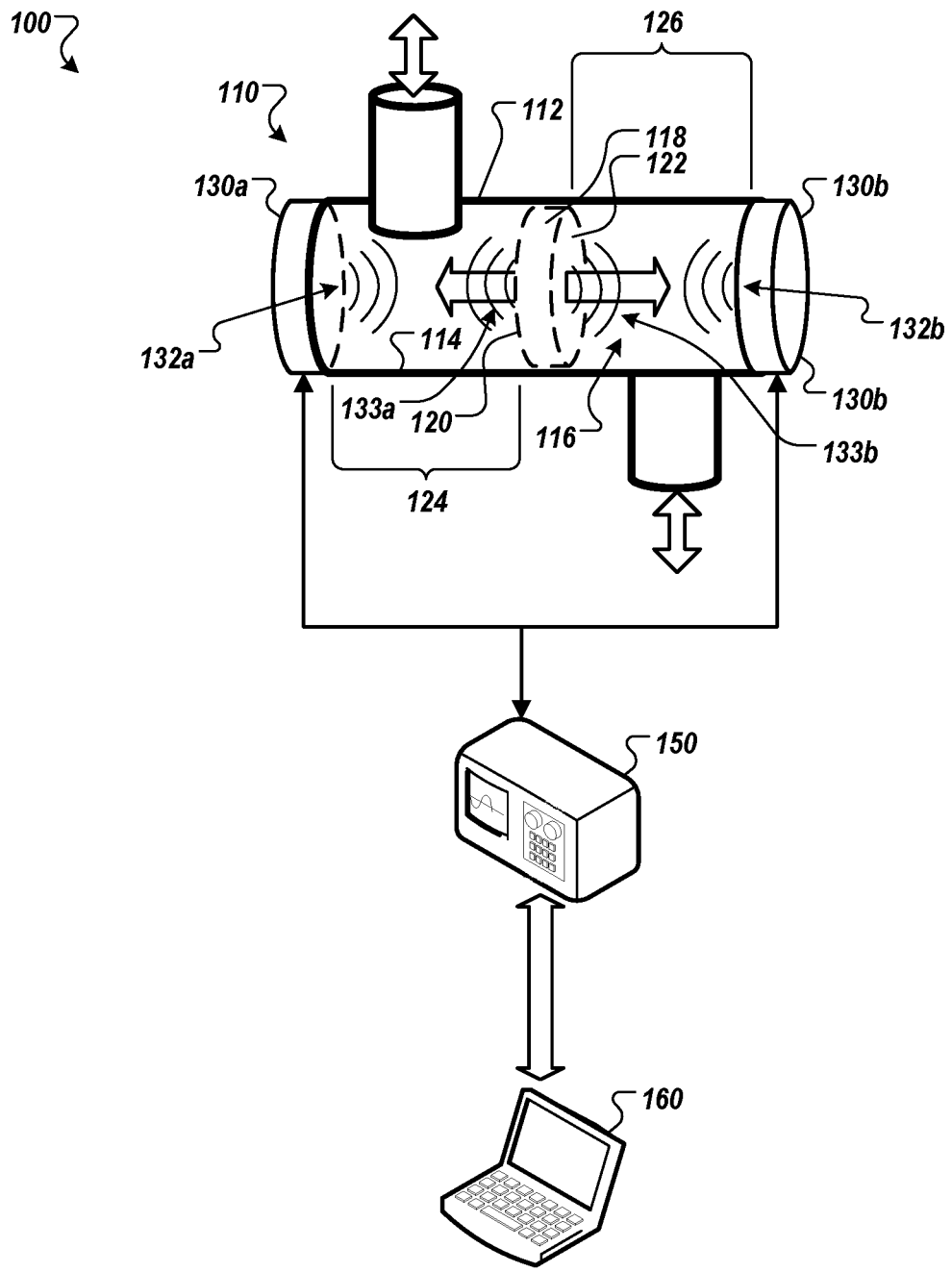
FIG. 1 is a schematic diagram that shows an example of a system for ultrasonic position measurement.

FIG. 1 is a schematic diagram that shows an example of a system 100 for ultrasonic position measurement (e.g., a position sensor system). The system 100 includes a fluid effector 110. The fluid effector 110 includes a housing 112 having an inner surface 114 defining a cavity 116 (e.g., a cylindrical cavity), and a moveable body 118. The moveable body 118 has a face 120 and a face 122 opposite the face 120, and is configured for reciprocal movement within the housing 112. The moveable body 118 is configured to contact the inner surface 114 and subdivide the cavity 116 to define a fluid chamber 124 at the face 120 and define a fluid chamber 126 at the face 122, and is configured for longitudinal movement within the cavity 116.

The fluid effector 110 includes an acoustic transceiver 130a. The acoustic transceiver 130a includes an acoustic transmitter system configured to emit an emitted acoustic waveform 132a in a first direction toward the face 120. The acoustic transceiver 130a also includes an acoustic receiver system configured to detect a reflected acoustic waveform 133a based on a first reflection of the emitted acoustic waveform 132a based on the moveable body 118. In some embodiments, a single transducer (e.g., a piezo element) can perform the functions of both the acoustic transmitter and the acoustic receiver. In some embodiments, the acoustic transmitter and the acoustic receiver can be discrete components.

The fluid effector 110 also includes an acoustic transceiver 130b. The acoustic transceiver 130b includes an acoustic transmitter system configured to emit an emitted acoustic waveform 132b in a second direction opposite the first direction toward the face 122. The acoustic transceiver 130a also includes an acoustic receiver system configured to detect a reflected acoustic waveform 133b based on a second reflection of the emitted acoustic waveform 132b based on the moveable body 118. In some embodiments, a single transducer (e.g., a piezo element) can perform the functions of both the acoustic transmitter and the acoustic receiver. In some embodiments, the acoustic transmitter and the acoustic receiver can be discrete components.

A signal processor 150 is configured to process signals from the acoustic transceiver 130a and the acoustic transceiver 130b to determine the position of the moveable body 118 within the cavity 116. A controller 160 (e.g., a computer) is configured to receive position information from the signal processor 150 and perform functions based on the position information (e.g., control a process, present information to a user, transmit information to another system, record a log). In some embodiments, the signal processor 150 can include a timer (e.g., to measure the times of flight of emitted and reflected signals). In some embodiments, the signal processor 150 can include a phase detector (e.g., to determine phase and/or Doppler shifts in reflected signals).

In general, the fluid effector 110 is configured as a ratiometric position-sensing device. A transmit-receive transducer is located on either end of the effector. Both transmitters can send a pulse echo and receive an echo upon reflection from the effector piston. Time measurements of the two transducers can independently determine the position of a moveable body when sound speed is known. However, when coupling two transducers into a system, sound speed is cancelled and a ratiometric ultrasound position sensor is obtained. In some implementations, if either transducer fails, redundancy can be obtained through measurement or approximation of sound speed. The techniques for processing the signals, and several embodiments of the fluid effector 110, will be discussed in the descriptions of FIGS. 2-8.

Figure 2:
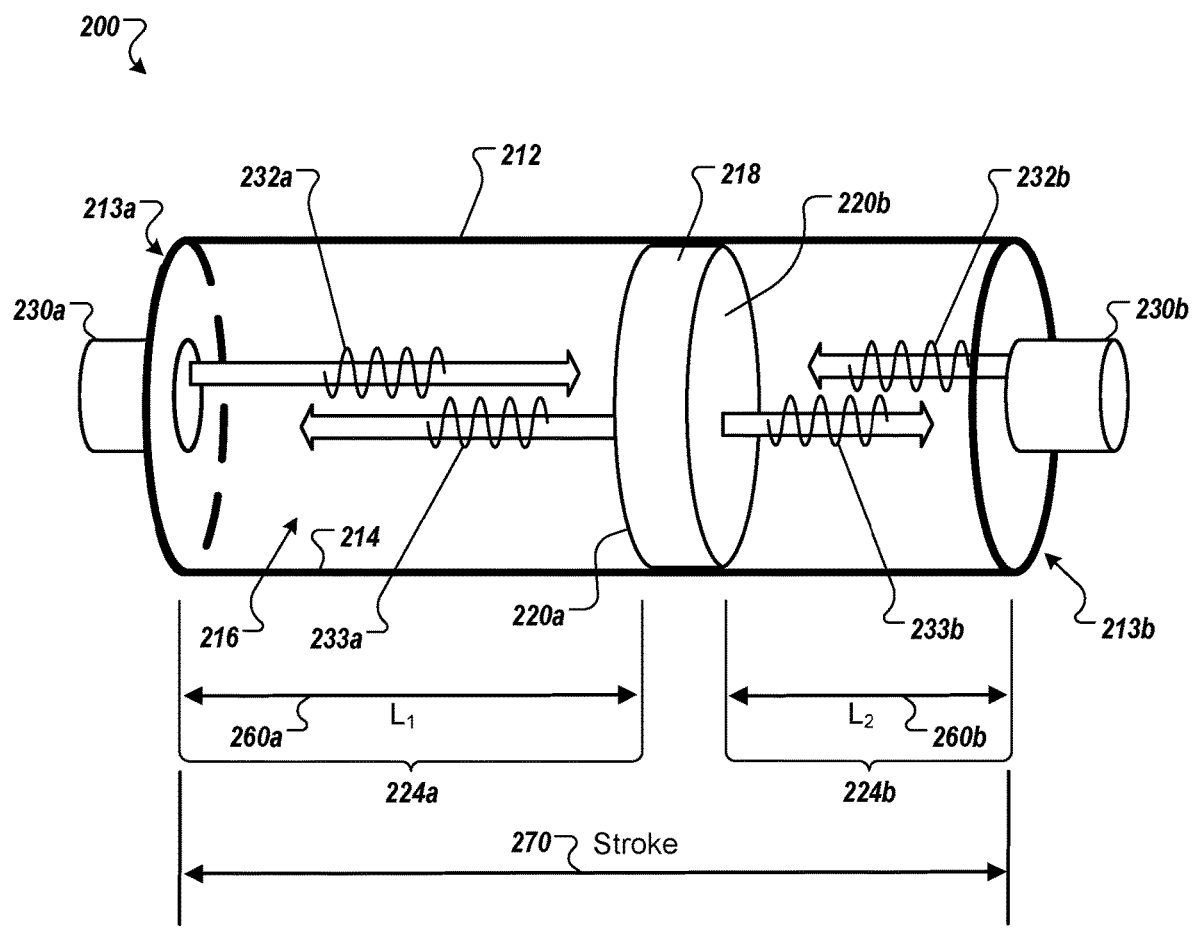
FIG. 2 is an internal view of an example of a linear fluid effector.

FIG. 2 is an internal view of an example of a linear fluid effector 200. In some implementations, the linear fluid effector 200 can be the example fluid effector 110 of FIG. 1.

The fluid effector 200 includes a housing 212 having an inner surface 214 defining a cavity 216 (e.g., a tubular cavity), and a moveable body 218. The housing 212 is generally tubular, having a first longitudinal end 213a and a second longitudinal end 213b opposite the first longitudinal end 213a, and a length represented by arrow 270.

The moveable body 218 has a face 220a and a face 220b opposite the face 220a. The moveable body 218 is configured for reciprocal movement within the housing 212. The moveable body 218 is configured to contact the inner surface 214 and subdivide the cavity 216 to define a fluid chamber 224a on the side of the face 220a and define a fluid chamber 224b on the side of the face 220b.

In some embodiments, the fluid effector 200 can be configured as a valve. For example, the housing 212 can be a valve housing and the moveable body 218 can be a valve body configured to slide longitudinally within the valve housing to control fluid flow. In some embodiments, the fluid effector 200 can be configured as a pressure regulator or sensor, in which fluid pressure in one or both of the fluid chambers 224a-224b can urge movement of the moveable body 218 within the housing. In some embodiments, the fluid effector 200 can be configured as a fluid actuator. For example, the housing 212 can be a hydraulic cylinder and the moveable body 218 can be a piston head that can be moved within the cavity 216 to urge a fluid flow; or a piston head that can be moved within the cavity 216 by fluid pressure within the fluid chambers 224a-224b. In some embodiments, the fluid effector 200 can be configured as any appropriate form of device in which a moveable body moves linearly within a fluid-filled cavity.

The fluid effector 200 includes an acoustic transceiver 230a. The acoustic transceiver 230a includes an acoustic transmitter system configured to emit an emitted acoustic waveform 232a toward the face 220a through a medium (e.g., a fluid) filling the fluid chamber 224a. The acoustic transceiver 230a also includes an acoustic receiver system configured to detect a reflected acoustic waveform 233a based on a reflection of the emitted acoustic waveform 232a off the moveable body 218.

The fluid effector 200 includes an acoustic transceiver 230b. The acoustic transceiver 230b includes an acoustic transmitter system configured to emit an emitted acoustic waveform 232b toward the first face 220b through a medium filling the fluid chamber 224b. The acoustic transceiver 230b also includes an acoustic receiver system configured to detect a reflected acoustic waveform 233b based on a reflection of the emitted acoustic waveform 232b off the moveable body 218. In some embodiments, a single transducer (e.g., a piezo element) can perform the functions of both the acoustic transmitter and the acoustic receiver. In some embodiments, the acoustic transmitter and the acoustic receiver can be discrete components.

The acoustic transceivers 230a-230b are configured to be activated by an external system such as the example signal processor 150 of FIG. 1, and provide signals based on the reflected acoustic waveforms 233a-233b to the external system for processing. In some embodiments, a single transducer (e.g., a piezo element) can perform the functions of both the acoustic transmitter and the acoustic receiver. In some embodiments, the acoustic transmitters and the acoustic receivers can be discrete components.

The medium through which the acoustic waveforms 232a and 233a travel has a speed of sound ($C_1$). In the illustrated example, the measured time ($t_1$) (e.g., a first time-of-flight) in conjunction with the sound speed ($C_1$) defines a distance $L_1$ (represented by arrow 260a) from the acoustic transceiver 230a to the face 220a of the moveable body 218:

$$2L_1 = t_1 * C_1 \quad \text{(Equation 1)}$$

The medium through which the acoustic waveforms 232b and 233b travel has a speed of sound ($C_2$). In the illustrated example, the measured time ($t_2$) (e.g., a second time-of-flight) in conjunction with the sound speed ($C_2$) defines a distance $L_2$ (represented by arrow 260b) from the acoustic transceiver 230b to the face 220b of the moveable body 218:

$$2L_2 = t_2 * C_2 \quad \text{(Equation 2)}$$

The acoustic transceivers 230a and 230b and the moveable body 218 can be configured such that the signals are used to determine a ratiometric value for the position of the moveable body 218 within its range of motion (e.g., the distance $L_1 + L_2$, or the length 270 minus the longitudinal thickness of the moveable body 218):

$$\text{Position} \sim \frac{t_1 - t_2}{t_1 + t_2} \sim \frac{\frac{2L_1}{C_1} - \frac{2L_2}{C_2}}{\frac{2L_1}{C_1} + \frac{2L_2}{C_2}} \quad \text{(Equation 3)}$$

In use, the speed of sound in the fluid that fills the cavity 216 does not need to be known or determined. Since both sides of the cavity 216 are filled with the same type of fluid under substantially the same conditions (e.g., temperature), the speed of sound in the fluid will be the same on both sides of the cavity 216, and the speed of sound becomes cancelled out of Equation 3. And since the speed of sound drops out of Equation 3, the relative position of the moveable body 218 within the cavity 216 becomes a unitless ratiometric value. An absolute position of the moveable body 218 can be determined, if needed, based on the ratiometric value and a predetermined value for the range of motion (e.g., $L_1 + L_2$), For example, if the range of motion is known to be 10 cm, and the position is determined to be 0.63 (e.g., based on $t_1$ and $t_2$), then the absolute position of the moveable body 218 within the cavity 216 can be determined.

For example, the transducers may sit flush with the bore of the cylinder on both ends (e.g., if the piston head sits on the wall time is zero on the face). In this example, if the piston is precisely in the middle, then $t_1 = t_2$, which is 50% of stroke. However, Equation 3 is Position~$(t_1-t_2)/(t_1+t_2)$→ ($t_1 = t_2$) (e.g., the numerator goes to zero). As the piston strokes in one direction, $t_1$ decreases and $t_2$ increases, driving the ratio negative. Conversely, as the piston strokes in the opposite direction, the ratio increases. So at one stop the position output is −1 in this example, and at the opposite stop the position output is +1. In another example, for an Equation 3 measurement of 0.63 this would fall between −1 (e.g., retract) and +1 (e.g., extend). The percentage of total stroke here becomes (0.63−(−1))/(1−(−1))→1.63/2→81.5% of total stroke. For a piston configuration having a total stroke of 10 cm, the actual position from the housing stop would be ($L_1+L_2$)*81.5%=10 cm*81.5%=8.15 cm, and the distance from the opposing stop would be 10 cm−8.15 cm=−1.85 cm.

Since the ratiometric value is based on the distances between the acoustic transceivers 230a and 230b and the faces 220a and 220b, the thickness of the moveable body 218 (e.g., the distance between the faces 220a and 220b) does not directly affect the ratiometric value. In some implementations, the absolute positions of the faces 220a and 220b can be determined based on a determined absolute position of the moveable body 218 and the predetermined thickness of the moveable body 218 (e.g, the absolute position of the face 220a-220b can be offset from the absolute position of the center of the moveable body 218 by plus or minus one-half the distance between the faces 220a and 220b or another predetermined offset distance).

The described technique can be extended to perform additional functions. For example, by pinging the two sides of the moveable body 218, the position of the moveable body 218 can be determined. By pinging the two sides of the moveable body 218 again to determine a second position of the moveable body, the difference in the two positions and the amount of time between the two measurements can be used to determine a speed of the moveable body 218. The determined speed of the moveable body 218 and predetermined knowledge of the mechanical configuration of the fluid effector 200 can be used to determine a linear velocity of the moveable body 218 (e.g., the speed can be determined, and the moveable body 218 is known to move linearly). In another example, multiple positions and/or velocities can be measured and/or determined, and such information can be used to determine an acceleration of the moveable body 218.

Figure 3:
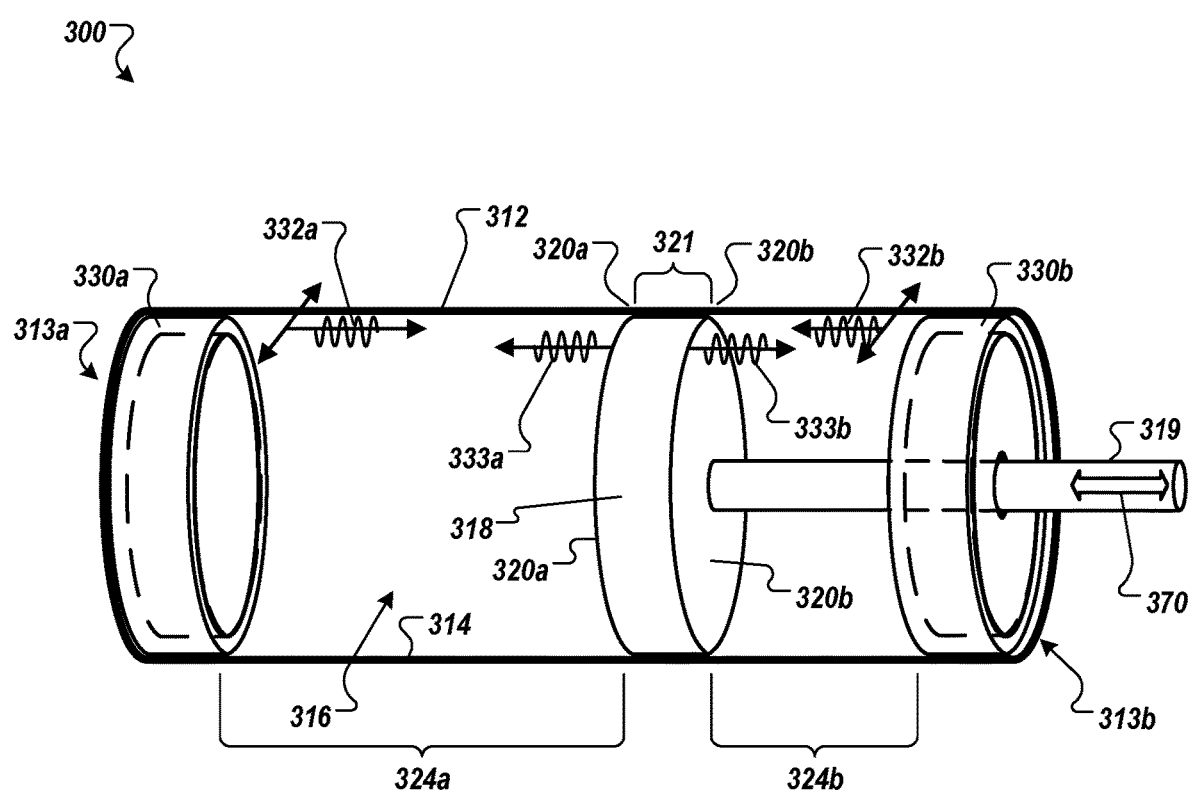
FIG. 3 is an internal view of another example of a linear fluid effector.
Figure 4:
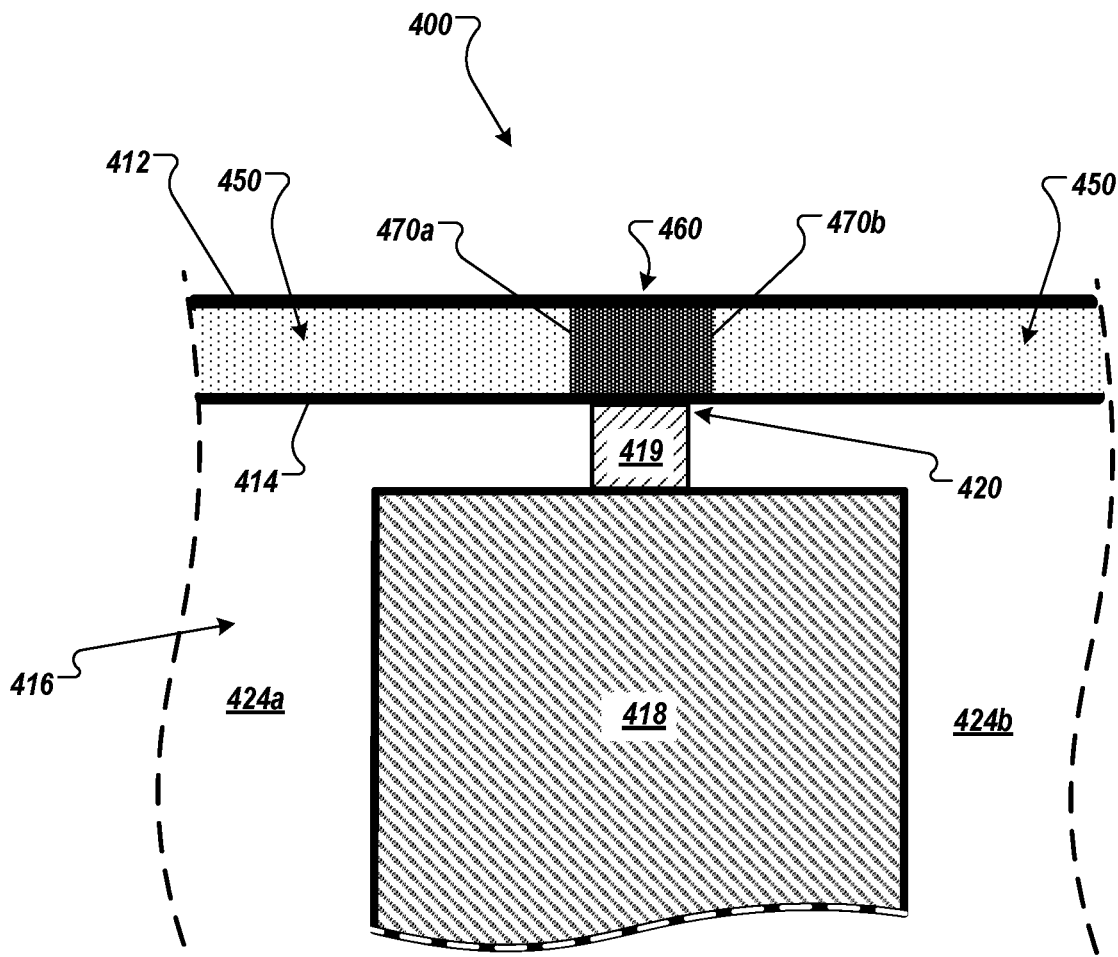
FIG. 4 is a sectional view of an example of an acoustic interface.
Figure 5:
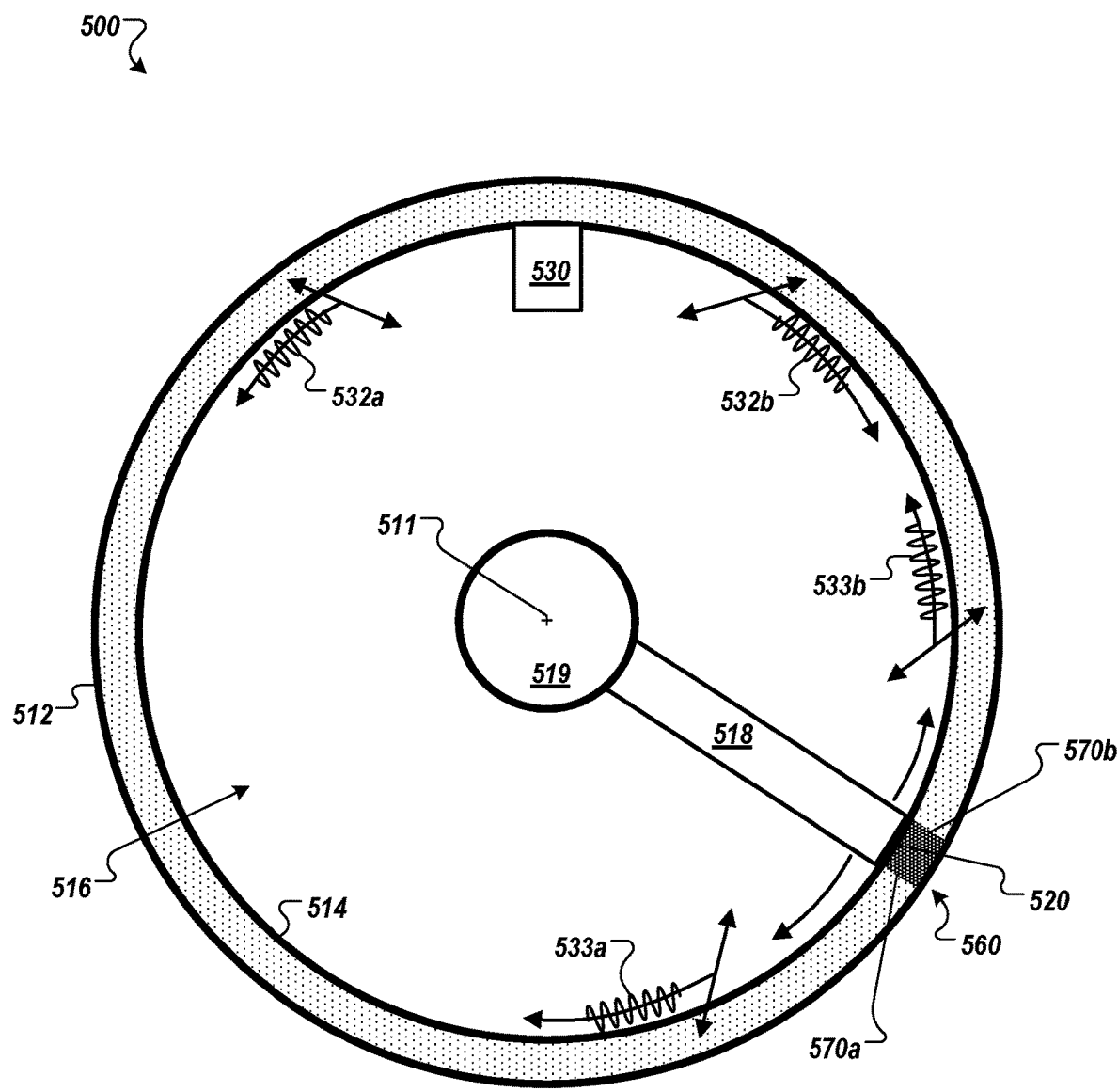
FIG. 5 is a sectional view of an example of a rotary fluid effector.

In the example fluid effector 200, the acoustic waveforms 232a and 232b are reflected off the faces 220a and 220b. The reason that the acoustic waveforms 232a and 232b are reflected is because the moveable body 218 defines an acoustic interface at the faces 220a and 220b. The fluid in the fluid chambers 224a and 224b has an acoustic impedance, and the moveable body 218 has a different acoustic impedance. As in many types of signal transmission systems, an impedance mismatch can cause a transmitted signal to be reflected. In the illustrated example in which ultrasonic signals are being transmitted, the locations of these impedance mismatches define the locations of acoustic interfaces. In the illustrated example, the face 220a and the face 220b define the locations of the acoustic impedance mismatches and their corresponding acoustic interfaces. Other examples of using acoustic interfaces for determining the location of a moveable body are discussed in further detail in the descriptions of FIGS. 3-5, FIG. 3 is an internal view of another example of a linear fluid effector 300 (e.g., a linear piston effector). In some implementations, the linear fluid effector 300 can be the example fluid effector 110 of FIG. 1. In general, this embodiment also relies on time of flight, but uses transverse waves propagating within the cylinder wall of the actuator instead of the hydraulic working fluid.

The linear fluid effector 300 includes a housing 312 having an inner surface 314 defining a cavity 316. A moveable body 318 (e.g., a piston head in the illustrated example) is configured to move longitudinally within the cavity 316 to actuate a piston rod 319. The housing 312 is generally tubular, having a first longitudinal end 313a and a second longitudinal end 313b opposite the first longitudinal end 313a.

The moveable body 318 has a face 320a and a face 320b opposite the face 320a. The moveable body 318 is configured for reciprocal movement within the housing 312 with a total stroke (represented by arrow 370). The moveable body 318 is configured to contact the inner surface 314 and subdivide the cavity 316 to define a fluid chamber 324a on the side of the face 320a and define a fluid chamber 324b on the side of the face 320b.

The linear fluid effector 300 includes an acoustic transceiver 330a. The acoustic transceiver 330a includes an acoustic transmitter system configured to emit an emitted acoustic waveform 332a through the housing 312 toward a first side 320a of an acoustic interface 321. The acoustic transceiver 330a also includes an acoustic receiver system configured to detect a reflected acoustic waveform 333a based on a reflection of the emitted acoustic waveform 332a off the acoustic interface 321.

The linear fluid effector 300 includes an acoustic transceiver 330b. The acoustic transceiver 330b includes an acoustic transmitter system configured to emit an emitted acoustic waveform 332b through the housing 312 toward a second side 320b of the acoustic interface 321. The acoustic transceiver 330b also includes an acoustic receiver system configured to detect a reflected acoustic waveform 333b based on a reflection of the emitted acoustic waveform 332b off the acoustic interface 321.

The acoustic transceivers 330a-330b are configured to be activated by an external system such as the example signal processor 150 of FIG. 1, and provide signals based on the reflected acoustic waveforms 333a-333b to the external system for processing. In some embodiments, a single transducer (e.g., a piezo element) can perform the functions of both the acoustic transmitter and the acoustic receiver. In some embodiments, the acoustic transmitter and the acoustic receiver can be discrete components.

Transverse waves and/or surface acoustic waves are generated by acoustic transceivers 330a-330b located on opposing ends of the cylinder wall in intimate acoustic contact with the housing 312. In some embodiments, the acoustic transceivers 330a-330b can be formed of bonded bulk ceramic, bulk single-crystal, or deposited piezoelectric layers, material films, or any other appropriate material that can form an integral part of the housing 312. The acoustic transceivers 330a-330b are configured to generate a hoop stress in the housing 312 which propagates in the axial direction along the housing 312. Transverse waves and surface acoustic waves cannot propagate within fluidic masses, substantially eliminating the effects of reverberation and cross coupling within the fluid that may otherwise interfere with measurement accuracy. The waves are reflected when they reach the moveable body 318, being in intimate contact with the housing 312, produces an abrupt acoustic impedance change in the propagation path.

In some implementations, this embodiment can be used in applications that cannot accommodate transducers in contact with the hydraulic fluid medium, cannot accommodate the required pressure ports into the hydraulic cylinder, would otherwise benefit from reduced size and location of the transducers, or require higher measurement accuracy than previous position indicators. In some implementations, sensor accuracy may not be substantially impacted compared to the echoes in the fluid. The acoustic transceivers 330a-330b may further be located within the inner diameter of the housing 312 in contact with the fluid, or externally on the outside of housing 312. In some embodiments, the acoustic transceivers 330a-330b can be fashioned as removable transducers. For example, the use of removable transducers can enable the techniques described in this document to be applied or retrofitted to hydraulic or pneumatic fluidic actuators not originally designed or conceived to possess position sensing functionality at the time of manufacture.

The process of determining the position of the moveable member 318 is similar to that of the process described in relation to the example fluid effector 200 of FIG. 2, except that instead of transmitting and receiving the acoustic waveforms 232a, 232b, 233a, and 233b though fluid in the fluid chambers 224a and 224b as in the example fluid effector 200, the acoustic waveforms 332a, 332b, 333a, and 333b are transmitted through the housing 312. The emitted acoustic waveforms 332a and 332b are reflected by the acoustic interface 321 as the reflected acoustic waveforms 333a and 333b.

In use, the times of flight of the emitted acoustic waveforms 332a and 332b, and their return as the reflected acoustic waveforms 333a and 333b can be measured (e.g., times-of-flight) and used to determine the ratiometric position (and by extension, the absolute position) of the moveable member 318 and the piston rod 319. For example, equations 1-3 discussed above can also be used with the times-of-flight determined from the linear fluid effector 300.

FIG. 4 is a sectional view of an example of an acoustic interface 400. In some examples, the acoustic interface 400 can be the example acoustic interface 321 of FIG. 3. In the illustrated example, a housing 412 includes an inner surface 414 that defines a cavity 416. A seal 419 is configured to contact the inner surface 414 and a moveable body 418 to subdivide the cavity 416 into a fluid chamber 424a and a fluid chamber 424b. The seal 419 contacts the housing 412 at a contact area 420.

Acoustic impedance is defined as $Z=\rho_B V_P$, where $\rho_B$ is the bulk density of the medium and is the longitudinal velocity of the wave in the medium. The housing 412 is made out a material that has a natural acoustic impedance, for example, due to the temperature, density, and other properties of the material from which the housing 412 is formed. In the illustrated example, the regions of the housing 412 having the natural acoustic impedance are represented by a light dither pattern and the identifier 450. For example, the acoustic impedance of aluminum is about 17.10 g/cm$^2$-sec×10$^5$, and the acoustic impedance of 347 stainless steel is about 45.40 g/cm$^2$-sec×10$^5$. These are just two examples of acoustic impedances for two different materials. The techniques described in this document make it unnecessary to know, determine, or estimate the acoustic impedance of a material.

The housing 412 also includes a region of modified acoustic impedance represented by a denser dither pattern and the identifier 460. In some embodiments, the effective acoustic impedance of a material can be affected by mechanical contact with or proximity to another object at or around the point of contact or proximity. For example, mechanical contact between the seal 419 and the housing 412 can acoustically dampen the housing 412 at or around the contact area 420 and increase the acoustic density of the housing 412 at or near the contact area 420. In such examples, the region 460 can have a relatively higher acoustic impedance than the regions 450. In another example, the seal 419 may have a lower acoustic impedance than the housing 412, and mechanical contact between the seal 419 and the housing 412 can provide a path of lesser acoustic impedance for acoustic vibrations travelling along the housing 412 at or near the contact area 420, effectively lowering the acoustic impedance of the acoustic transmission pathway in the region 460 relative to the regions 450.

In general, when two sections of a transmission medium have different impedances, an impedance mismatch is presented. The boundaries between differing acoustic impedances define the locations of acoustic impedance mismatches, which are also called acoustic interfaces. In the illustrated example, acoustic waves traverse at the interface of the fluid and the housing (e.g., along the inner surface 414). The mismatch in impedance occurs when the fluid becomes the seal. The junctions where the inner surface 414, the fluid, and the seal 419 coincide one another define an acoustic interface 470*a* and an acoustic interface 470*b*.

As in many types if signal transmission processes, a signal that propagates along a transmission pathway and then encounters an impedance mismatch can result in at least a portion of the signal to be reflected back along the transmission pathway. Similarly, acoustic signals (e.g., the emitted acoustic waveforms 332*a* and 332*b*) can be reflected back toward their sources by acoustic interfaces.

In the illustrated example, the locations of the acoustic interfaces 470*a* and 470*b* within the housing 412 are defined by the location of the moveable body 418 within the cavity 416 (e.g., the moveable body 418 defines the location of the seal 419, which defines the location of the region 460, which defines the locations of the acoustic interfaces 470*a* and 470*b*). Movement of the moveable body 418 causes the acoustic interfaces 470*a* and 470*b* to move as well.

Returning briefly to FIG. 3, movement of the moveable body 318 causes corresponding movements of acoustic interfaces (e.g., the acoustic interfaces 470*a* and 470*b*) within the housing 312. As the moveable body 318 moves, the distances between the acoustic transceivers 330*a* and 330*b* and their respective acoustic interfaces change as well, which causes proportional changes in the times-of-flight of the emitted acoustic waveforms 332*a* and 332*b* and the reflected acoustic waveforms 333*a* nd 333*b*. As discussed above, the times of flight can be used to determine the ratiometric position of the acoustic interfaces along the housing 312, and therefore determine the position of the moveable member 318 within the cavity 316. As also discussed above, these locations can be determined without knowing or determining the acoustic properties of the housing (e.g., the acoustic impedances of the housing or of regions of modified acoustic impedance, which can change dynamically with temperature).

FIG. 5 is a sectional view of an example of a rotary fluid effector 500. In some implementations, the rotary fluid effector 500 can be the example fluid effector 110 of FIG. 1. The rotary fluid effector 500 includes a housing 512 having an inner surface 514 defining a cavity 516 that is generally cylindrical. A moveable body 518 (e.g., a rotary vane in the illustrated example) is configured to move semi-elliptically (e.g., rotate, pivot) about a central axis 511 of a shaft 519 within the cavity 516. In some embodiments, the moveable body 518 can be configured to urge rotation of the shaft 519.

The moveable body 518 is configured to contact the inner surface 514 (e.g., directly or through a seal) along a contact area 520 at or along an axial position of the generally cylindrical housing 512. The materials used to form the housing 512 have an acoustic impedance, and the contact between the moveable body 518 and the housing 512 modified the acoustic impedance of the housing 512 at or around the contact area 520 to define a region 560 having a modified acoustic impedance. The region 560 presents an acoustic impedance mismatch within the housing 512, having an acoustic interface 570*a* and an acoustic interface 570*b*.

The rotary fluid effector 500 includes an acoustic transceiver 530, The acoustic transceiver 530 includes an acoustic transmitter system configured to emit an emitted acoustic waveform 532*a* through the housing 512 toward the acoustic interface 570*a*, The acoustic transceiver 530 also includes an acoustic receiver system configured to detect a reflected acoustic waveform 533*a* based on a reflection of the emitted acoustic waveform 532*a* off the acoustic interface 570*a*.

The acoustic transceiver 530 is also configured to emit an emitted acoustic waveform 532*b* through the housing 512 toward the acoustic interface 570*b* of the region 560. The acoustic transceiver 530 also includes an acoustic receiver system configured to detect a reflected acoustic waveform 533*b* based on a reflection of the emitted acoustic waveform 532*b* off the acoustic interface 570*b*, In the illustrated example, the acoustic transceiver 530 is configured to perform the transmission and receipt of the acoustic waveforms 532*a*, 532*b*, 533*a*, and 533*b* (e.g., by "ringing" the housing 512 at a single location and having the emitted waveforms 532*a*-532*b* propagate away from both sides), but in some embodiments separate acoustic transceivers can be used (e.g., one configured to ring the periphery of the housing 512 in a clockwise direction and another configured to ring the periphery in a counter-clockwise direction).

The acoustic transceiver 530 is configured to be activated by an external system such as the example signal processor 150 of FIG. 1, and provide signals based on the reflected acoustic waveforms 533*a*-533*b* to the external system for processing. In some embodiments, a single transducer (e.g., a piezo element) can perform the functions of both the acoustic transmitter and the acoustic receiver. In some embodiments, the acoustic transmitter and the acoustic receiver can be discrete components.

The process of determining the position of the moveable body 518 is similar to that of the process described in relation to the example linear fluid effector 300 of FIG. 3, except that instead of transmitting and receiving the acoustic waveforms 332*a*, 332*b*, 333*a*, and 333*b* along the longitudinal length of the housing 312 as in the example linear fluid effector 300, the acoustic waveforms 532*a*, 532*b*, 533*a*, and 533*b* are transmitted circumferentially (e.g., orbitally) about the housing 512. The emitted acoustic waveforms 532*a* and 532*b* are reflected by the acoustic interface 521 as the reflected acoustic waveforms 533*a* and 533*b*.

In use, the times of flight of the emitted acoustic waveforms 532*a* and 532*b*, and their return as the reflected acoustic waveforms 533*a* and 533*b* can be measured (e.g., times-of-flight) and used to determine the ratiometric position (and by extension, the absolute position) of the moveable body 518 and the shaft 519. For example, equations 1-3 discussed above can also be used with the times-of-flight determined from the rotary fluid effector 500.

In some embodiments, the rotary fluid effector 500 can be a rotary vane actuator (RVA) or a rotary valve. In some embodiments, the rotary fluid effector can be modified to be a rotary piston actuator (RPA), For example, emitted waveforms can be transmitted circumferentially about a tubular housing toward the end of a rotary piston that is configured to move about the axis of the housing and define an acoustic interface within a portion of the housing, and the acoustic interface can reflect a portion of the waveforms for use in determining the rotary position of the rotary piston.

Figure 6:
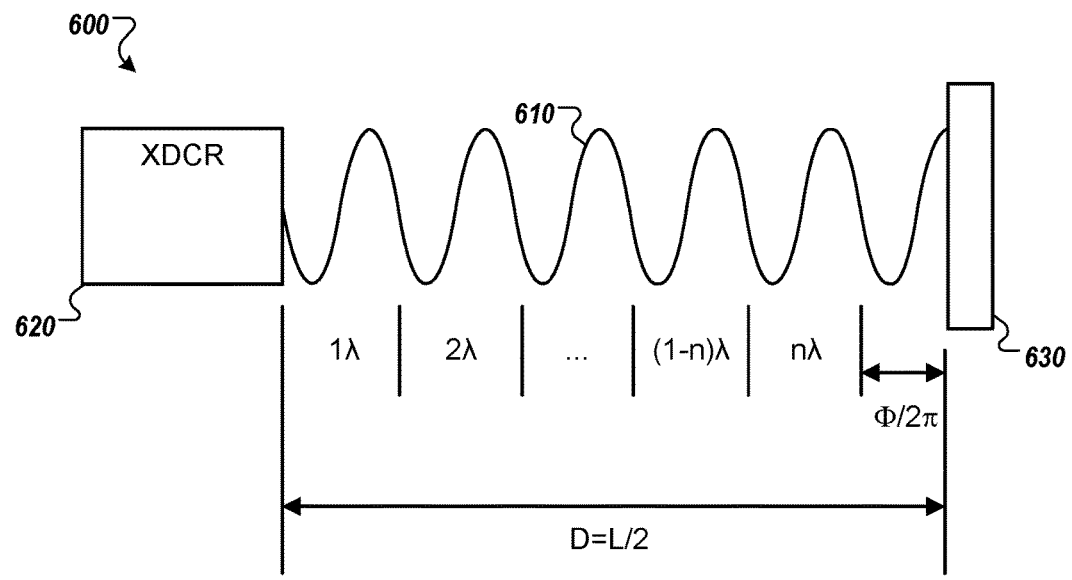
FIG. 6 is a conceptual diagram of a transmitted acoustic waveform.
Figure 7:
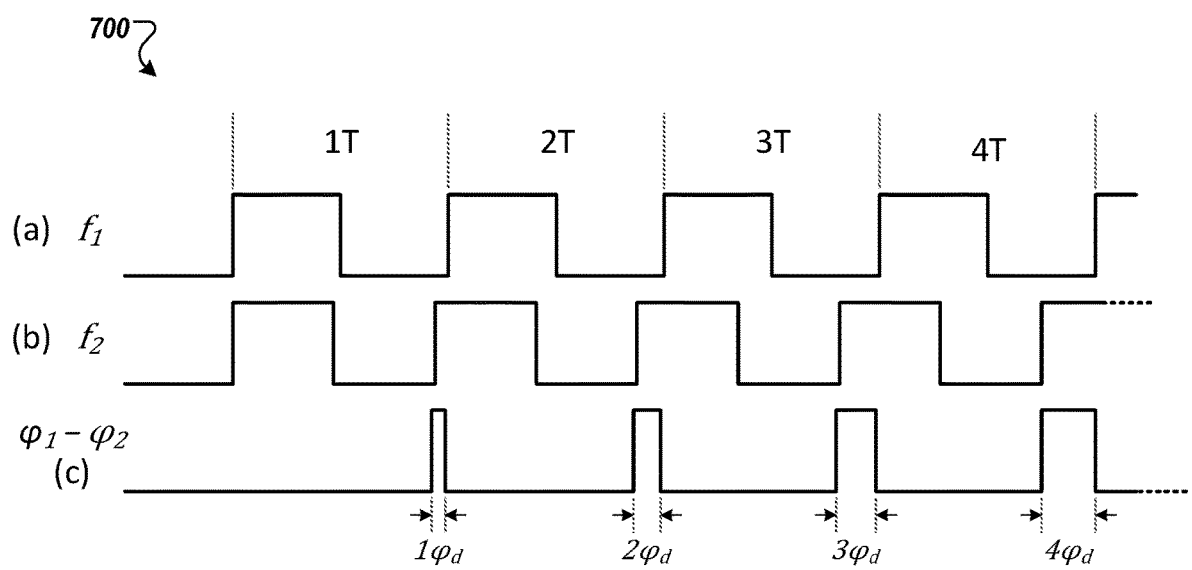
FIG. 7 is a graph showing examples of phase shifts in acoustic waveforms.

FIG. 6 is a conceptual diagram 600 of a transmitted acoustic waveform 610. FIG. 7 is a graph 700 showing examples of phase shifts in acoustic waveforms. In addition to time based measurement (e.g., as discussed above), time and phase are related to one another as a function of frequency and wavelength. In the illustrated example, the transmitted acoustic waveform 610 is transmitted by an acoustic transceiver 620 as a continuous wave of single frequency f. The transmitted acoustic waveform 610 is broadcast toward a moveable reflector 630 positioned at some distance D from the reflector. The transmitted acoustic waveform 610 is reflected back toward the acoustic transceiver 620, and reaches the acoustic transceiver 620 after making a round trip of length L=2D.

The acoustic transceiver 620 travels some whole number n of wavelengths plus a fraction, where wavelength is given by:

$\lambda = c/f$ where c=sound speed, f=wave frequency  (Equation 4)

Using Equation 4, the round trip distance to target can be written as:

$$D = \left(n_1 + \frac{\phi}{2\pi}\right) \times \frac{\lambda}{2} \qquad \text{(Equation 5)}$$

$$\phi_1 = 2\pi f_1 T_1 = \frac{4\pi f_1 d_1}{c} \qquad \text{(Equation 6)}$$

$$T_1 = \frac{\phi_1}{2\pi f_1} \qquad \text{(Equation 7)}$$

$$\phi_2 = 2\pi f_2 T_2 = \frac{4\pi f_2 d_2}{c} \qquad \text{(Equation 8)}$$

$$T_2 = \frac{\phi_2}{2\pi f_2} \qquad \text{(Equation 9)}$$

Where the $\phi/2\pi$ term is equivalent to time as shown in Equations 7 and 9. If $n_1=0$, Equation 2 is unambiguous and since the frequency f and fluid sound speed are known apriori, D can be determined by direct measurement of the phase of the received signal relative to the transmitted signal.

When $n_1>1$, D is ambiguous as the measured phase values repeat at intervals of $2\pi f$. The value $n_1$ can be extracted from the measured data based on the idea that the differential phase shift of two simultaneously propagating waves of differing frequencies will generate progressively larger phase shifts; the value of the increase is a constant $\varphi_d$ as the travel time increases. This is shown in FIG. 7. Detecting the two signals at some distance D and knowing they began traveling at the same time the measured phase can be divided by cod to extract the number of complete wave periods that occurred to generate the measured phase difference. Mathematically:

$$|\phi_1 - \phi_2| = D\left(\frac{1}{\lambda_1} - \frac{1}{\lambda_2}\right) = \frac{\Delta\phi}{2\pi} \qquad \text{(Equation 10)}$$

The phase difference embodiment modifies the time difference embodiment by applying a fixed frequency $f_1$ to the phase measurement in one of the fluid chambers, and another fixed frequency $f_2$ to the other fluid chamber. The exact frequency values of $f_1$ and $f_2$ are not critical to the function of the invention, however it is critical that the frequencies are selected to ensure that $n_1=n_2$ or $n_1=n_2+1$. This relationship ensures that the value of $\varphi_d$ remains constant over the entire measurement range.

Rewriting Equation 3, using Equations 7 and 9:

$$\text{Stroke} \sim \frac{t_1 - t_2}{t_1 + t_2} \sim \frac{\frac{\phi_1}{2\pi f_1} - \frac{\phi_2}{2\pi f_2}}{\frac{\phi_1}{2\pi f_1} + \frac{\phi_2}{2\pi f_2}} = \frac{\left|\phi_1 - \frac{f_1}{f_2}\phi_2\right|}{\left|\phi_1 + \frac{f_1}{f_2}\phi_2\right|} \qquad \text{(Equation 11)}$$

The phase embodiment maintains the same ratiometric benefits of mechanical length and sound speed insensitivity as the time of flight embodiment. The frequency $f_1$ is related to $f_2$ by a fixed ratio. This condition ensures the relative phase difference remains constant with circuit aging and temperature change. Other embodiments can remove this restriction with the result of reduced aging performance and temperature compensation without substantively altering the method.

Ultrasonic pulses are emitted periodically as is prescribed for position measurement. Following each emission, the returned echo signal is sampled at a fixed delay after the emission, From Equations 13 and 14, this delay defines the depth.

As the actuator moves between the successive emissions the sampled values taken at time $T_s$ will change over the time. As the speed information is available only periodically, the technique is limited by the Nyquist theorem. This means that a maximum speed exists for each pulse repetition frequency ($F_{prf}$):

$$V_{max} = \frac{F_{prf} * C}{4 * F_e * \cos\delta} \qquad \text{(Equation 12)}$$

The maximum measurable depth is also defined by the pulsed repetition frequency:

$$P_{max} = \frac{C}{2 * F_{prf}} \qquad \text{(Equation 13)}$$

Therefore the product of $P_{max}$ and $V_{max}$ is constant, and is given by:

$$P_{max} * V_{max} = \frac{C^2}{8 * F_s * \cos\delta} \qquad \text{(Equation 14)}$$

Figure 8:
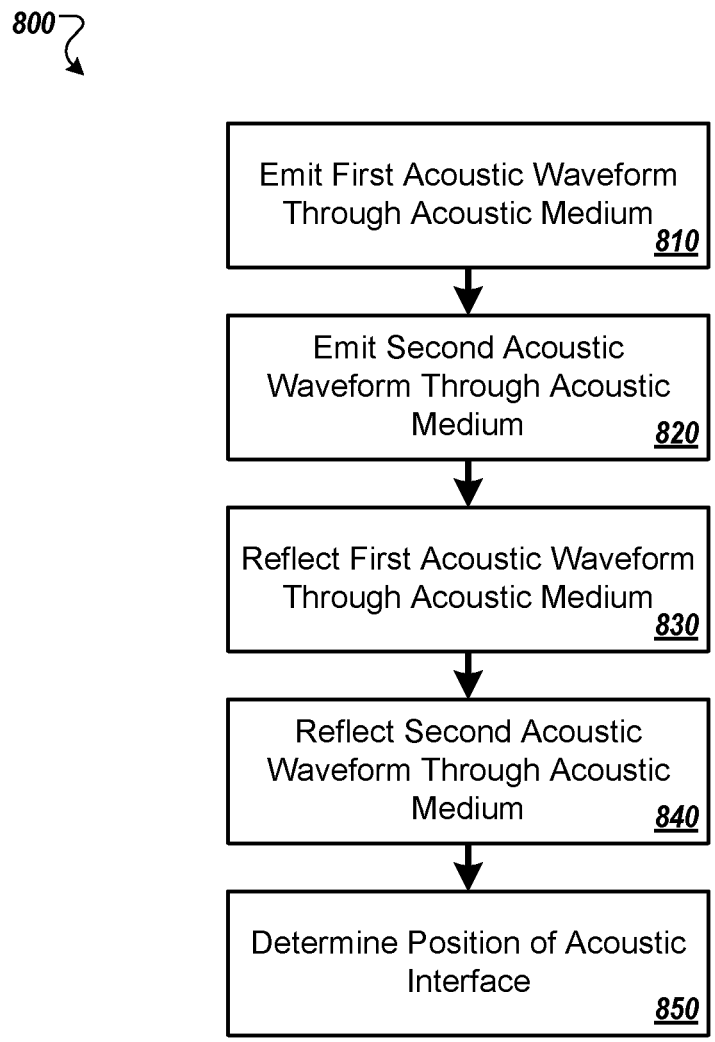
FIG. 8 is a flow diagram of an example process for ultrasonic position sensing.

FIG. 8 is a flow diagram of an example process 800 for ultrasonic position sensing. In some implementations, the process 800 can be performed by all or part of the example system 100 of FIG. 1, the example fluid effector 110, the example linear fluid effector 200 of FIG. 2, the example linear fluid effector 300 of FIG. 3, or the example rotary fluid effector 500 of FIG. 5.

At 810, a first emitted acoustic waveform is emitted in a first direction through an acoustic medium having a first acoustic impedance toward a first side of an acoustic interface. For example, the acoustic transceiver 130a can emit the emitted acoustic waveform 132a toward the face 120 of the moveable body 118 through a fluid in the cavity 116, In another example, the acoustic transceiver 530 can emit the emitted acoustic waveform 532a toward the acoustic interface 570a of the moveable body 518 through the housing 512.

At 820, a second emitted acoustic waveform is emitted in a second direction, opposite the first direction, through the acoustic medium toward a second side of the acoustic interface opposite the first side. For example, the acoustic transceiver 130b can emit the emitted acoustic waveform 132b toward the face 122 of the moveable body 118 through a fluid in the cavity 116, In another example, the acoustic transceiver 530 can emit the emitted acoustic waveform 532b toward the acoustic interface 570b through the housing 512.

At 830, a first reflected acoustic waveform is reflected by the acoustic interface in the second direction based on the first emitted acoustic waveform. For example, the face 120 can reflect the reflected acoustic waveform 133a back toward the acoustic transceiver 130a. In another example, the acoustic interface 570a can reflect the reflected acoustic waveform 533a back toward the acoustic transceiver 530.

At 840, a second reflected acoustic waveform is reflected by the acoustic interface in the first direction based on the second emitted acoustic waveform. For example, the face 122 can reflect the reflected acoustic waveform 133b back toward the acoustic transceiver 130b. In another example, the acoustic interface 570b can reflect the reflected acoustic waveform 533b back toward the acoustic transceiver 530.

At 850, a first position of the acoustic interface is determined based on the first reflected acoustic waveform and the second acoustic waveform. For example, measurements based on the acoustic waveforms 132a, 132b, 133a, and 133b, or the acoustic waveforms 532a, 532b, 533a, and 533b can be used with Equations 1-14 to determine the positions of the moveable bodies 118 or 518.

In some implementations, the process 800 can also include determining a first time of flight based on the first emitted acoustic waveform and the first reflected acoustic waveform, and determining a second time of flight based on the second emitted acoustic waveform and the second reflected acoustic waveform, where determining a first position of the acoustic interface is further based on the first time of flight and the second time of flight. In some implementations, determining the first position of the acoustic interface based on the first time of flight ($t_1$) and the second time of flight ($t_2$) is given by an equation: $(t_1-t_2)/(t_1+t_2)$. For example, Equation 3 shows an example of how times of flight of reflected acoustic waveforms can be used to determine a ratiometric position of the acoustic interface that caused the reflections.

In some implementations, the process 800 can also include determining a second position of the acoustic interface, and determining a speed of the acoustic interface based on the first positon and the second position. For example, by determining a first position of the moveable body 118, a second position of the moveable body 118, and the amount of time between the two positions, a speed at which the moveable body 118 is moving can be determined.

In some implementations, the process 800 can include determining a reflected acoustic frequency based on one or both of the first reflected acoustic waveform and the second acoustic waveform, and determining a speed of the acoustic interface based on the determined reflected acoustic frequency and a predetermined emitted acoustic frequency of one or both of the first emitted acoustic waveform and the second emitted acoustic waveform. For example, the emitted acoustic waveforms 132a and 132b can be emitted at a predetermined emitted frequency, and movement of the example moveable body 118 can cause a Doppler shift in the reflected acoustic waveforms 133a and 113b. The degree of the Doppler shift can be measured to determine a speed of the moveable body 118 relative to the acoustic transceivers 130a and 130b.

In some implementations, the acoustic medium can be a fluid having a first acoustic impedance, the acoustic interface can be defined by a moveable body within a fluid effector and having a second acoustic impedance that is different than the first acoustic impedance, the first emitted acoustic waveform can be emitted toward a first face of the moveable body through the fluid, the second emitted acoustic waveform can be emitted toward a second face of the moveable body, arranged opposite the first face, through the fluid, the first reflected acoustic waveform can be based on a first reflection of the first emitted acoustic waveform by the first face, and the second reflected acoustic waveform can be based on a second reflection of the second emitted acoustic waveform by the second face. For example, the emitted acoustic waveforms 132a and 132b can travel through a fluid in the cavity 116 to the face 120 and the face 122, and be reflected back through the fluid to the acoustic transceivers 130a and 130b.

In some implementations, the acoustic medium can be a housing of a fluid effector, the housing having a first acoustic impedance and defining a cavity, and also including contacting a portion of the housing with a moveable body configured for movement within the cavity, and modifying, based on the contacting, the first acoustic impedance of the contacted portion of the housing to define a portion of the housing having a second acoustic impedance that is different from the first acoustic impedance, where the contacted portion of the housing defines the acoustic interface. For example, contact between the example seal 419 and the example housing 412 can develop the region of modified acoustic impedance 460.

In some implementations, the process 800 can also include determining a phase difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform, wherein determining a first position of the acoustic interface is further based on the determined phase difference. For example, the differences in phase between the emitted acoustic waveform 132a and the reflected acoustic waveform 133a can be used (e.g., in the example Equations 4-14) to determine a position of the moveable body 118.

All of the embodiments described can provide, in addition to position, direct measurement of actuator speed by the incorporation of signal processing to extract Doppler shift information (e.g., reflected frequency) from the transducer(s) signals. While only one of the plurality of transducers is required to be processed, Doppler processing of two transducers can provide higher accuracy by a factor of about 1.4× over the use of a single channel.

Figure 9:
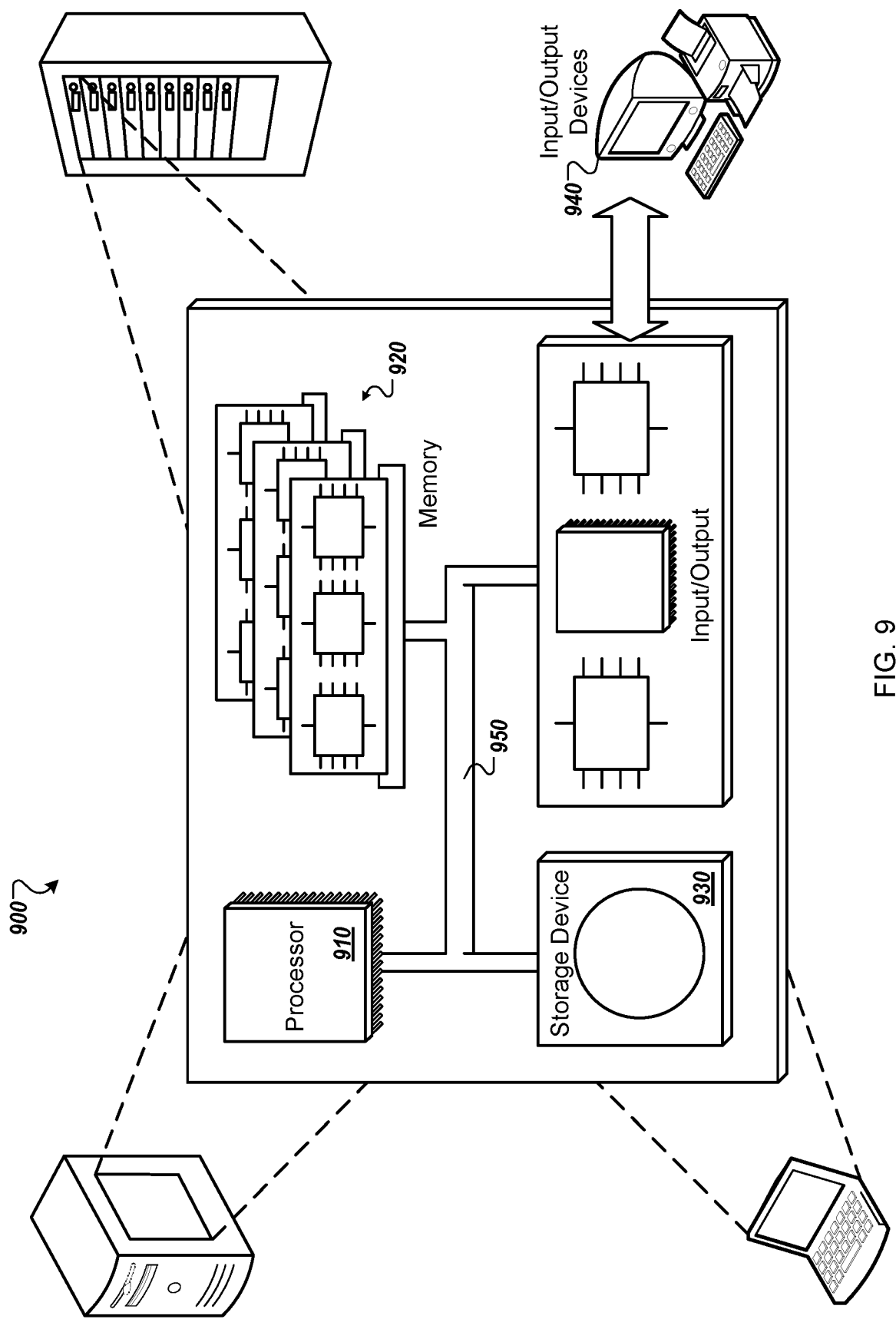
FIG. 9. is a schematic diagram of an example of a generic computer system.

FIG. 9 is a schematic diagram of an example of a generic computer system 900. The system 900 can be a data processing apparatus (e.g., processor system) used for the operations described in association with the process 800 according to one implementation. For example, the system 900 may be included in either or all of the signal processor 150 or the controller 160.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces. In another implementation, input/output device 940 includes a serial link, (e.g., Ethernet, CAN, RS232, RS485, optical fiber), for example, to interface to a remote host and/or to send measurement results, either in a command/response protocol, or at some periodic update rate after a short initialization period (e.g., <1 sec). In another implementation the input/output device 940 includes a data bus connection to a second computer system or processor.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, t least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer, Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component; such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A position sensor system, comprising:
    a rotary fluid effector comprising:
        a housing having an inner surface defining a cylindrical cavity defining a central axis; and
        a moveable body having a first face and a second face opposite the first face and configured for reciprocal movement within the housing and configured to contact the inner surface and subdivide the cylindrical cavity to define a first fluid chamber at the first face and define a second fluid chamber at the second face, the moveable body comprising a piston head configured for semi-elliptical movement within the cylindrical cavity about the central axis and defining an acoustic interface in a first portion of the housing proximal an axial position of the piston head within the cylindrical cavity;
    an acoustic transmitter system configured to emit a first emitted acoustic waveform elliptically through a second portion of the housing about the central axis in a first direction toward the first portion, and emit a second emitted acoustic waveform elliptically through a third portion of the housing about the central axis in a second direction opposite the first direction toward the second portion; and an acoustic receiver system comprising a first acoustic receiver arranged proximal the acoustic transmitter system and configured to detect a first reflected acoustic waveform based on a first reflection of the first emitted acoustic waveform based on the moveable body, and a second acoustic receiver arranged proximal the acoustic transmitter system and configured to detect a second reflected acoustic waveform based on a second reflection of the second emitted acoustic waveform based on the moveable body.

2. The position sensor system of claim 1, further comprising a timer configured to determine a first time of flight of the first emitted acoustic waveform and the first reflected acoustic waveform, and determine a second time of flight of the second emitted acoustic waveform and the second reflected acoustic waveform.

3. The position sensor system of claim 2, further comprising a processor system configured to determine a position of the moveable body within the cylindrical cavity based on the first time of flight and the second time of flight.

4. The position sensor system of claim 1, wherein the acoustic transmitter system is configured to emit one or both of the first emitted acoustic waveform and the second emitted acoustic waveform through a fluid in the cylindrical cavity, and the acoustic receiver system is configured to receive one or both of the first reflected acoustic waveform and the second reflected acoustic waveform from the fluid in the cylindrical cavity.

5. The position sensor system of claim 1, wherein the acoustic transmitter system is configured to emit one or both of the first emitted acoustic waveform and the second emitted acoustic waveform through the housing, and the acoustic receiver system is configured to receive one or both of the first reflected acoustic waveform and the second reflected acoustic waveform from the housing.

6. The position sensor system of claim 5, wherein the housing comprises an acoustic impedance based on a position of an acoustic interface defined by contact between the moveable body and the housing, and at least one of the first reflected acoustic waveform and the second reflected acoustic waveform are at least partly reflected based on the acoustic impedance.

7. The position sensor system of claim 1, wherein the acoustic transmitter system is configured to transmit the first emitted acoustic waveform at a predetermined emitted frequency, and the acoustic receiver system is configured to determine a reflected frequency of the first reflected acoustic waveform.

8. The position sensor system of claim 7, further comprising a processor system configured to determine a speed of the moveable body based on the predetermined emitted frequency and the reflected frequency.

9. The position sensor system of claim 1, wherein:
the cylindrical cavity is a tubular cavity having a first longitudinal end and a second longitudinal end opposite the first longitudinal end;
the moveable body is a piston head configured for longitudinal movement within the tubular cavity;
the acoustic transmitter system comprises a first acoustic transmitter arranged at the first longitudinal end and a second acoustic transmitter arranged at the second longitudinal end; and the acoustic receiver system comprises a first acoustic receiver arranged at the first longitudinal end and a second acoustic receiver arranged at the second longitudinal end.

10. The position sensor system of claim 1, further comprising a phase detector configured to determine a difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform.

11. A method of position sensing comprising:
contacting a portion of a housing of a fluid effector with a moveable body configured for movement within a cavity defined by the housing, the housing having a first acoustic impedance;
modifying, based on the contacting, the first acoustic impedance of the contacted portion of the housing to define a portion of the housing having a second acoustic impedance that is different from the first acoustic impedance, wherein the contacted portion of the housing defines an acoustic interface;
emitting a first emitted acoustic waveform in a first direction through the housing toward a first side of the acoustic interface;
emitting a second emitted acoustic waveform in a second direction, opposite the first direction, through the housing toward a second side of the acoustic interface opposite the first side;
reflecting, by the acoustic interface, a first reflected acoustic waveform in the second direction based on the first emitted acoustic waveform;
reflecting, by the acoustic interface, a second reflected acoustic waveform in the first direction based on the second emitted acoustic waveform; and
determining a first position of the acoustic interface based on the first reflected acoustic waveform and the second reflected acoustic waveform.

12. The method of claim 11, further comprising:
determining a first time of flight based on the first emitted acoustic waveform and the first reflected acoustic waveform; and
determining a second time of flight based on the second emitted acoustic waveform and the second reflected acoustic waveform;
wherein determining a first position of the acoustic interface is further based on the first time of flight and the second time of flight.

13. The method of claim 12, wherein determining the first position of the acoustic interface based on the first time of flight ($t_1$) and the second time of flight ($t_2$) is given by an equation: $(t_1-t_2)/(t_1+t_2)$.

14. The method of claim 11, further comprising:
determining a second position of the acoustic interface; and
determining a speed of the acoustic interface based on the first position and the second position.

15. The method of claim 11, further comprising:
determining a reflected acoustic frequency based on one or both of the first reflected acoustic waveform and the second reflected acoustic waveform; and
determining a speed of the acoustic interface based on the determined reflected acoustic frequency and a predetermined emitted acoustic frequency of one or both of the first emitted acoustic waveform and the second emitted acoustic waveform.

16. The method of claim 11, further comprising determining a phase difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform, wherein determining a first position of the acoustic interface is further based on the determined phase difference.

17. A non-transitory computer storage medium encoded with a computer program, the computer program comprising instructions that when executed by data processing apparatus cause the data processing apparatus to perform operations comprising:
  emitting a first emitted acoustic waveform in a first direction, through a housing of an fluid effector having a moveable body configured for reciprocal movement within the housing and having a first acoustic impedance, toward a first side of an acoustic interface defined by contact between the moveable body and the housing, wherein a second acoustic impedance is based on a position of the acoustic interface;
  emitting a second emitted acoustic waveform in a second direction, opposite the first direction, through the housing toward a second side of the acoustic interface opposite the first side;
  detecting a first reflected acoustic waveform, based on the first emitted acoustic waveform, reflected in the second direction by the acoustic interface at least partly based on the second acoustic impedance;
  detecting a second reflected acoustic waveform, based on the second emitted acoustic waveform, reflected in the first direction by the acoustic interface at least partly based on the second acoustic impedance; and
  determining a first position of the acoustic interface based on the detected first reflected acoustic waveform and the detected second reflected acoustic waveform.

18. A position sensor system, comprising:
  a fluid effector comprising:
    a housing having an inner surface defining a cavity;
    a moveable body having a first face and a second face opposite the first face and configured for reciprocal movement within the housing and configured to contact the inner surface and subdivide the cavity to define a first fluid chamber at the first face and define a second fluid chamber at the second face; and
    an acoustic impedance based on a position of an acoustic interface defined by contact between the moveable body and the housing;
  an acoustic transmitter system configured to emit a first emitted acoustic waveform in a first direction toward the first face, and emit a second emitted acoustic waveform in a second direction opposite the first direction toward the second face; and
  an acoustic receiver system configured to detect a first reflected acoustic waveform based on a first reflection of the first emitted acoustic waveform based on the moveable body, and detect a second reflected acoustic waveform based on a second reflection of the second emitted acoustic waveform based on the moveable body, wherein at least one of the first reflected acoustic waveform and the second reflected acoustic waveform are at least partly reflected based on the acoustic impedance.

19. The position sensor system of claim 18, further comprising a timer configured to determine a first time of flight of the first emitted acoustic waveform and the first reflected acoustic waveform, and determine a second time of flight of the second emitted acoustic waveform and the second reflected acoustic waveform.

20. The position sensor system of claim 19, further comprising a processor system configured to determine a position of the moveable body within the cavity based on the first time of flight and the second time of flight.

21. The position sensor system of claim 18, wherein the acoustic transmitter system is configured to emit one or both of the first emitted acoustic waveform and the second emitted acoustic waveform through a fluid in the cavity, and the acoustic receiver system is configured to receive one or both of the first reflected acoustic waveform and the second reflected acoustic waveform from the fluid in the cavity.

22. The position sensor system of claim 18, wherein the acoustic transmitter system is configured to emit one or both of the first emitted acoustic waveform and the second emitted acoustic waveform through the housing, and the acoustic receiver system is configured to receive one or both of the first reflected acoustic waveform and the second reflected acoustic waveform from the housing.

23. The position sensor system of claim 18, wherein the acoustic transmitter system is configured to transmit the first emitted acoustic waveform at a predetermined emitted frequency, and the acoustic receiver system is configured to determine a reflected frequency of the first reflected acoustic waveform.

24. The position sensor system of claim 23, further comprising a processor system configured to determine a speed of the moveable body based on the predetermined emitted frequency and the reflected frequency.

25. The position sensor system of claim 18, wherein:
  the fluid effector is a linear piston effector;
  the cavity is a tubular cavity having a first longitudinal end and a second longitudinal end opposite the first longitudinal end;
  the moveable body is a piston head configured for longitudinal movement within the tubular cavity;
  the acoustic transmitter system comprises a first acoustic transmitter arranged at the first longitudinal end and a second acoustic transmitter arranged at the second longitudinal end; and
  the acoustic receiver system comprises a first acoustic receiver arranged at the first longitudinal end and a second acoustic receiver arranged at the second longitudinal end.

26. The position sensor system of claim 18, wherein:
  the fluid effector is a rotary fluid effector;
  the cavity is a cylindrical cavity defining a central axis;
  the moveable body is a piston head configured for semi-elliptical movement within the cylindrical cavity about the central axis and defines an acoustic interface in a first portion of the housing proximal an axial position of the piston head within the cylindrical cavity;
  the acoustic transmitter system is configured to emit the first emitted acoustic waveform elliptically through a second portion of the housing about the central axis in a first direction toward the first portion, and is configured to emit the second emitted acoustic waveform elliptically through a third portion of the housing about the central axis in a second direction opposite the first direction toward the first portion; and
  the acoustic receiver system comprises a first acoustic receiver arranged proximal the acoustic transmitter system and configured to receive the first reflected acoustic waveform, and a second acoustic receiver arranged proximal the acoustic transmitter system and configured to receive the second reflected acoustic waveform.

27. The position sensor system of claim 18, further comprising a phase detector configured to determine a difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform.

28. A method of position sensing comprising:
   emitting a first emitted acoustic waveform in a first direction through an acoustic medium having a first acoustic impedance toward a first side of an acoustic interface;
   emitting a second emitted acoustic waveform in a second direction, opposite the first direction, through the acoustic medium toward a second side of the acoustic interface opposite the first side;
   reflecting, by the acoustic interface, a first reflected acoustic waveform in the second direction based on the first emitted acoustic waveform;
   reflecting, by the acoustic interface, a second reflected acoustic waveform in the first direction based on the second emitted acoustic waveform;
   determining a first position of the acoustic interface based on the first reflected acoustic waveform and the second reflected acoustic waveform; and
   determining a phase difference between at least one of (1) a first emitted phase of the first emitted acoustic waveform and a first reflected phase of the first reflected acoustic waveform, and (2) a second emitted phase of the second emitted acoustic waveform and a second reflected phase of the second reflected acoustic waveform, wherein determining a first position of the acoustic interface is further based on the determined phase difference.

29. The method of claim 28, further comprising:
   determining a first time of flight based on the first emitted acoustic waveform and the first reflected acoustic waveform; and
   determining a second time of flight based on the second emitted acoustic waveform and the second reflected acoustic waveform;
   wherein determining a first position of the acoustic interface is further based on the first time of flight and the second time of flight.

30. The method of claim 29, wherein determining the first position of the acoustic interface based on the first time of flight ($t_1$) and the second time of flight ($t_2$) is given by an equation: $(t_1-t_2)/(t_1+t_2)$.

31. The method of claim 28, further comprising:
   determining a second position of the acoustic interface; and
   determining a speed of the acoustic interface based on the first position and the second position.

32. The method of claim 28, further comprising:
   determining a reflected acoustic frequency based on one or both of the first reflected acoustic waveform and the second reflected acoustic waveform; and
   determining a speed of the acoustic interface based on the determined reflected acoustic frequency and a predetermined emitted acoustic frequency of one or both of the first emitted acoustic waveform and the second emitted acoustic waveform.

33. The method of claim 28, wherein:
   the acoustic medium is a fluid having a first acoustic impedance;
   the acoustic interface is defined by a moveable body within a fluid effector and having a second acoustic impedance that is different than the first acoustic impedance;
   the first emitted acoustic waveform is emitted toward a first face of the moveable body through the fluid;
   the second emitted acoustic waveform is emitted toward a second face of the moveable body, arranged opposite the first face, through the fluid;
   the first reflected acoustic waveform is based on a first reflection of the first emitted acoustic waveform by the first face; and
   the second reflected acoustic waveform is based on a second reflection of the second emitted acoustic waveform by the second face.

34. The method of claim 28, wherein the acoustic medium is a housing of a fluid effector, the housing having a first acoustic impedance and defining a cavity, and further comprising:
   contacting a portion of the housing with a moveable body configured for movement within the cavity; and
   modifying, based on the contacting, the first acoustic impedance of the contacted portion of the housing to define a portion of the housing having a second acoustic impedance that is different from the first acoustic impedance;
   wherein the contacted portion of the housing defines the acoustic interface.

\* \* \* \* \*

UNITED STATES PATENT AND TRADEMARK OFFICE
CERTIFICATE OF CORRECTION

PATENT NO. : 11,668,818 B2
APPLICATION NO. : 16/987828
DATED : June 6, 2023
INVENTOR(S) : Jordan Loren Loos and Gregory Warren Pulley It is certified that error appears in the above-identified patent and that said Letters Patent is hereby corrected as shown below:

In the Specification

In Column 1, Line 42, please delete "positon" and insert -- position --.

In Column 4, Line 30, please delete "sizing," and insert -- sizing --.

In Column 4, Line 53, please delete "waveforms," and insert -- waveforms. --.

In Column 4, Line 56, please delete "FIG. 9." and insert -- FIG. 9 --.

In Column 6, Line 33, please delete "flow;" and insert -- flow, --.

In Column 7, Line 43, please delete "$L_2$)," and insert -- $L_2$). --.

In Column 8, Line 7, please delete "(e.g," and insert -- (e.g., --.

In Column 11, Line 31, please delete "nd" and add -- and --.

In Column 11, Line 64, please delete "530," and insert -- 530. --.

In Column 11, Line 67, please delete "570a," and insert -- 570a. --.

In Column 12, Line 10, please delete "570b," and insert -- 570b. --.

In Column 12, Line 51, please delete "(RPA)," and insert -- (RPA). --.

In Column 13, Line 41, please delete "cod" and insert -- $\varphi_d$ --.

In Column 14, Line 13, please delete "emission," and insert -- emission. --.

Signed and Sealed this
Nineteenth Day of September, 2023

*Katherine Kelly Vidal*

Katherine Kelly Vidal
*Director of the United States Patent and Trademark Office*

In Column 14, Line 56 please delete "116," and insert -- 116. --.

In Column 15, Line 43, please delete "positon" and insert -- position --.

In Column 17, Line 38, please delete "t least" and insert -- at least --.

In Column 17, Line 51, please delete "computer," and insert -- computer. --.

In Column 18, Line 13, please delete "component;" and insert -- component, --.